United States Patent
Bergeron

(10) Patent No.: US 11,623,761 B2
(45) Date of Patent: Apr. 11, 2023

(54) METHOD OF AND APPARATUS FOR DISPLAYING AN INTERACTIVE INTERFACE DURING AIRCRAFT ABNORMAL EVENT

(71) Applicant: BOMBARDIER INC., Dorval (CA)

(72) Inventor: Marc Bergeron, Lasalle (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 16/955,976

(22) PCT Filed: Dec. 20, 2018

(86) PCT No.: PCT/CA2018/051634
§ 371 (c)(1),
(2) Date: Jun. 19, 2020

(87) PCT Pub. No.: WO2019/119139
PCT Pub. Date: Jun. 27, 2019

(65) Prior Publication Data
US 2021/0094700 A1    Apr. 1, 2021

Related U.S. Application Data

(60) Provisional application No. 62/609,021, filed on Dec. 21, 2017.

(51) Int. Cl.
*G06F 3/048*     (2013.01)
*B64D 43/00*    (2006.01)
(Continued)

(52) U.S. Cl.
CPC ........... *B64D 43/00* (2013.01); *G06F 3/0482* (2013.01); *G06F 3/04886* (2013.01);
(Continued)

(58) Field of Classification Search
CPC ........ B64D 43/00; B64D 45/00; B60K 35/00; B60K 2370/1438; B60K 2370/1446;
(Continued)

(56) References Cited

U.S. PATENT DOCUMENTS 8,098,175 B2   1/2012  Berthou et al.
8,497,784 B1   7/2013  Vandrovec
(Continued)

OTHER PUBLICATIONS

International Search Report with regard to PCT/CA2018/051634 dated Apr. 9, 2019.

*Primary Examiner* — Aleksey Olshannikov
(74) *Attorney, Agent, or Firm* — BCF LLP

(57) ABSTRACT

A method and apparatus for generating an interactive interface on a display of an aircraft comprising: determining that an aircraft system has a faulty condition, the aircraft system comprising a plurality of system functions, the system functions being independently 5 actuatable, the determining comprising: generating an indication of which one of the system functions is associated with the faulty condition; generating the interactive interface, the interactive interface comprising a visual representation of a control panel, the control panel comprising a plurality of actuatable switches, each one of the actuatable switches being associated with a corresponding one of the system functions, the generating comprising: 0 determining, based on the indication, which one of the actuatable switches is to be associated with a visual faulty status, and displaying, on the display, the interactive interface comprising the visual faulty status.

27 Claims, 5 Drawing Sheets

(51) Int. Cl.
*G06F 3/0482* (2013.01)
*G06F 3/04886* (2022.01)
*G06F 3/041* (2006.01)

(52) U.S. Cl.
CPC .............. *B60K 2370/1438* (2019.05); *B60K 2370/1446* (2019.05); *B60K 2370/178* (2019.05); *G06F 3/0412* (2013.01)

(58) Field of Classification Search
CPC ............ B60K 2370/178; G06F 3/0482; G06F 3/04886; G06F 3/0412; G05B 2219/24103; G05B 23/027
See application file for complete search history.

(56) References Cited

U.S. PATENT DOCUMENTS

| | | |
|---|---|---|
| 8,798,811 B2 | 8/2014 | Vial |
| 9,399,525 B2 | 7/2016 | Mesguen et al. |
| 9,540,117 B2 | 1/2017 | Mumaw et al. |
| 2004/0176887 A1 | 9/2004 | Kent et al. |
| 2015/0261379 A1 | 9/2015 | Kneuper et al. |
| 2016/0004374 A1 | 1/2016 | Kneuper et al. |
| 2017/0088284 A1 | 3/2017 | Holder |
| 2017/0129621 A1 | 5/2017 | Flotte et al. |
| 2019/0081479 A1* | 3/2019 | Faley ........................ H02J 3/32 |

* cited by examiner

METHOD OF AND APPARATUS FOR DISPLAYING AN INTERACTIVE INTERFACE DURING AIRCRAFT ABNORMAL EVENT

CROSS-REFERENCE TO RELATED APPLICATIONS

The present application claims priority to U.S. Provisional Patent Application No. 62/609,021, filed Dec. 21, 2017, the entirety of which is incorporated herein by reference.

FIELD

The present technology relates to aircraft display systems, and more precisely to methods and systems for displaying an interactive page during aircraft abnormal events.

BACKGROUND

Modern aircrafts typically have cockpits with a plurality of displays for providing flight data information electronically to an aircraft crew. Such displays are typically part of an electronic flight instrument system (EFIS) that includes, among others, heads-up displays (HUD), primary flight displays (PFD), secondary flight displays (SFD), multi-function displays (MFD), and engine-indicating and crew-alerting systems (EICAS).

Generally, such displays provide a plethora of information about the aircraft systems and the aircraft environment, and allow controlling different aircraft system functions. The different displays provide aircraft systems status information and allow partial or complete control of the aircraft systems. Such aircraft systems may include, but without being limitative, flight control systems, communication systems, engine control systems, fuel systems, hydraulic systems, electrical systems, pneumatic systems, environmental control systems, emergency systems, and other advanced systems.

While such displays have helped improving the general flight experience, the sheer amount of information displayed on the units may be sometimes inconvenient to manage for the aircraft crew, particularly when an abnormal event occurs during one or more of the different phases of flight.

An abnormal event, such as an event when an aircraft system or subsystem becomes defective, unresponsive, or inoperable, generally triggers various levels of warnings and/or alerts on the displays of the EFIS. Electronic checklists may also be made available to the crew for assisting in completing in a coordinated manner, a series of steps and verifications for maintaining a secure flight.

Depending on the nature of the abnormal event(s) and how the aircraft systems and subsystems are configured, some aircraft systems and subsystems may be marked as unavailable or inaccessible to the crew, even though they may still be at least partially operating.

U.S. Patent Publication No. 2017/0129621 A1 published on May 11, 2017 to THALES and titled "Method and system for pilot decision aid for the aircraft piloting and associated computer program product" teaches a decision aid method including acquiring (110) operating states of systems, the operating states being determined by a monitoring system; determining (120) an availability state of each operational capacity, based on the operating states of only the systems of the aircraft implementing that operational capacity, each availability state being chosen from among the group consisting of: a normal state, a downgraded state, an impacted state and a lost state; selecting (150) one or more operational capacities based on the current movement context of the aircraft; communicating (150) the availability state of each selected operational capacity to the pilot.

U.S. Pat. No. 9,399,525 B2 granted on Jul. 27, 2016 to Airbus Operation SAS and titled "Method, systems, and computer readable media for troubleshooting an aircraft system during system failure" teaches methods, systems, and computer readable media for troubleshooting and repairing an aircraft system failure during abnormal situations of an aircraft's operation. One aspect of a method for implementing the subject matter described herein includes at least one interactive interface configured for troubleshooting and repairing an aircraft system failure. The method also includes displaying at least one or more graphic object representing at least one or more aircraft system and configured for receiving interaction from a user, displaying at least one or more energy flow icon representing the direction of circulation of an energy flow, and displaying at least one or more macro action icon configured for performing an automated action sequence configured for troubleshooting and repairing the system failure.

U.S. Pat. No. 9,540,117 B2 granted on Jan. 10, 2017 to Boeing Co. and titled "Failure analysis system" teaches a failure analysis system for monitoring subsystem failures in an aircraft that comprises a plurality of subsystems, the aircraft having a plurality of functions, wherein each function is available when one or more associated subsystems is operating correctly. The failure analysis system comprising: a plurality of monitors for monitoring the status of one or more subsystems of the aircraft and determining if a failure has occurred; a memory arranged to store a list of a plurality of flight phases or operating modes to be completed by the monitored system and data associating one or more of the functions with each flight phase or operating mode; and a processor in communication with the monitors and the memory and arranged to model the response of the subsystems to a failure determined by the monitors to identify which functions required by the flight phases or operating modes are degraded or are not available.

Therefore, there is a need for an improved interactive interface to indicate which controls are still available during an aircraft abnormal event.

SUMMARY

The present technology arises from an observation made by the inventor(s) that prior art solutions do not provide advanced indications for failed cockpit panels that could be presented to the flight crew in order to avoid workload and confusion when there is an aircraft abnormal event. Moreover, when an abnormal event occurs, there is additional workload to perform a checklist or to get another document to know which controls are still operative. Furthermore, knowledge of which controls are still operative is unlikely to be retained in user memory when there is a need to actuate the controls.

Additionally, the inventor(s) of the present technology have also appreciated that the reporting of failures usually covers failure of digital controls, when some hardwired controls on a control panel are still operative even when a failure of the control panel is reported.

Thus, in one aspect, various implementations of the present technology provide a method for generating an interactive interface on a display of an aircraft, the method executable by an electronic device connected to the display, the method comprising: determining that an aircraft system has a faulty condition, the aircraft system comprising a plurality of system functions, the system functions being independently actuatable, the determining comprising: generating an indication of which one of the system functions is associated with the faulty condition, generating the interactive interface, the interactive interface comprising a visual representation of a control panel, the control panel comprising a plurality of actuatable switches, each one of the actuatable switches being associated with a corresponding one of the system functions, the generating comprising: determining, based on the indication, which one of the actuatable switches is to be associated with a visual faulty status, and displaying, on the display, the interactive interface comprising the visual faulty status.

In some embodiments, the visual faulty status comprises a visual representation that the actuatable switch is no longer actuatable.

In some embodiments, the visual faulty status comprises at least one of a color code and an icon representative of a faulty status.

In some embodiments, the the actuatable switches that are not associated with the visual faulty status are actuatable through the interactive interface and the actuatable switches that are associated with the visual faulty status are not actuatable through the interactive interface.

In some embodiments, the display is a touchscreen.

In some embodiments, the display is part of an Engine Indication and Crew Alerting System (EICAS).

In some embodiments, the aircraft system comprises at least one of a flight control system, a communication system, an engine control system, a fuel system, a hydraulic system, an electrical system, a pneumatic system, an environmental control system, an emergency system and an advanced system.

In some embodiments, the actuatable switches comprises visual representation of at least one of a knob, a switch, a slider, and a toggle button.

In some embodiments, the actuatable switches comprise tactile actuatable switches.

Thus, in one aspect, various implementations of the present technology provide an apparatus for generating an interactive interface on a display of an aircraft, the apparatus comprising: a display device, one or more data processors operatively coupled to the display device, and non-transitory machine-readable memory operatively coupled to the one or more data processors, storing instructions executable by the one or more data processors and configured to cause the one or more data processors to: determine that an aircraft system has a faulty condition, the aircraft system comprising a plurality of system functions, the system functions being independently actuatable, the determining comprising: generating an indication of which one of the system functions is associated with the faulty condition, generate the interactive interface, the interactive interface comprising a visual representation of a control panel, the control panel comprising a plurality of actuatable switches, each one of the actuatable switches being associated with a corresponding one of the system functions, the generating comprising: determining, based on the indication, which one of the actuatable switches is to be associated with a visual faulty status, and display, on the display, the interactive interface comprising the visual faulty status.

In some embodiments, the visual faulty status comprises a visual representation that the actuatable switch is no longer actuatable.

In some embodiments, the visual faulty status comprises at least one of a color code and an icon representative of a faulty status.

In some embodiments, the actuatable switches that are not associated with the visual faulty status are actuatable through the interactive interface and the actuatable switches that are associated with the visual faulty status are not actuatable through the interactive interface.

In some embodiments, the display is a touchscreen.

In some embodiments, the display is part of an Engine Indication and Crew Alerting System (EICAS).

In some embodiments, the aircraft system comprises at least one of a flight control system, a communication system, an engine control system, a fuel system, a hydraulic system, an electrical system, a pneumatic system, an environmental control system, an emergency system and an advanced system.

In some embodiments, the actuatable switches comprises visual representation of at least one of a knob, a switch, a slider, and a toggle button.

In some embodiments, the actuatable switches comprise tactile actuatable switches.

Thus, in one aspect, various implementations of the present technology provide a computer program product for generating an interactive interface on a display of an aircraft, the computer program product comprising a non-transitory computer readable storage medium containing program code, the program code readable/executable by a computer, processor or logic circuit to perform a method comprising: determining that an aircraft system has a faulty condition, the aircraft system comprising a plurality of system functions, the system functions being independently actuatable, the determining comprising: generating an indication of which one of the system functions is associated with the faulty condition, generating the interactive interface, the interactive interface comprising a visual representation of a control panel, the control panel comprising a plurality of actuatable switches, each one of the actuatable switches being associated with a corresponding one of the system functions, the generating comprising: determining, based on the indication, which one of the actuatable switches is to be associated with a visual faulty status, and displaying, on the display, the interactive interface comprising the visual faulty status.

In some embodiments, the visual faulty status comprises a visual representation that the actuatable switch is no longer actuatable.

In some embodiments, the visual faulty status comprises at least one of a color code and an icon representative of a faulty status.

In some embodiments, the actuatable switches that are not associated with the visual faulty status are actuatable through the interactive interface and the actuatable switches that are associated with the visual faulty status are not actuatable through the interactive interface.

In some embodiments, the display is a touchscreen.

In some embodiments, the display is part of an Engine Indication and Crew Alerting System (EICAS).

In some embodiments, the aircraft system comprises at least one of a flight control system, a communication system, an engine control system, a fuel system, a hydraulic system, an electrical system, a pneumatic system, an environmental control system, an emergency system and an advanced system.

In some embodiments, the actuatable switches comprises visual representation of at least one of a knob, a switch, a slider, and a toggle button.

In some embodiments, the actuatable switches comprise tactile actuatable switches.

In the context of the present specification, unless expressly provided otherwise, a computer system may refer, but is not limited to, an "electronic device", a "controller", an "flight control computer", "a flight control system", a "flight computer", an "avionic computer", an "Engine-Indicating and Crew-Alerting System (EICAS)", a "server", a, "remote server", a "computer-based system" and/or any combination thereof appropriate to the relevant task at hand. Thus, some non-limiting examples of hardware and/or software include computers (flight computer, digital computer, etc.), aircraft equipment (controller, display screen, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a data could include the data itself (i.e. its contents), or it could be a unique data descriptor identifying a file with respect to a particular file system, or some other means of directing the recipient of the indication to a network location, memory address, database table, signal (whether analogic or numeric) or other location where the file may be accessed. As one skilled in the art would recognize, the degree of precision required in such an indication depends on the extent of any prior understanding about the interpretation to be given to data being exchanged as between the sender and the recipient of the indication. For example, if it is understood prior to a communication between a sender and a recipient that an indication of data element will take the form of a database key for an entry in a particular table of a predetermined database containing the data element, then the sending of the database key is all that is required to effectively convey the data element to the recipient, even though the data element itself was not transmitted as between the sender and the recipient of the indication.

In the context of the present specification, unless expressly provided otherwise, a "visual representation" may refer to one or more graphical icons and/or other forms of visual indicators which may or may not include alpha/numeric textual information. The visual representation may also broadly refer to one or more graphical elements which may or may not be an icon and which may be designed so as to visually indicate the operative status of one or more system functions of the aircraft systems and subsystems. The visual representation may be designed in a way which aims at reducing a cognitive effort required by a user (e.g., a pilot and/or a co-pilot) to interpret which system functions of the systems and subsystems of the aircraft are functional and/or faulty. The user may typically be, but not limited to, one or more cabin crew members such as a pilot and/or a co-pilot. The visual representation may be presented to the user through a wide variety of supports such as a display screen or a projection device (either worn by the user or directly mounted on the aircraft) which may be broadly referred to as a display surface. Multiple variations regarding how the visual representation is designed and how the visual representation is presented to the user may be envisioned without departing from the scope of the present technology and will become apparent to the person skilled in the art.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first indication" and "second indication" is not intended to imply any particular order, type, chronology, hierarchy or ranking (for example) of/between the indications, nor is their use (by itself) intended to imply that any "third indication" must necessarily exist in any given situation. Further, as is discussed herein in other contexts, reference to a "first" element and a "second" element does not preclude the two elements from being the same actual real-world element.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
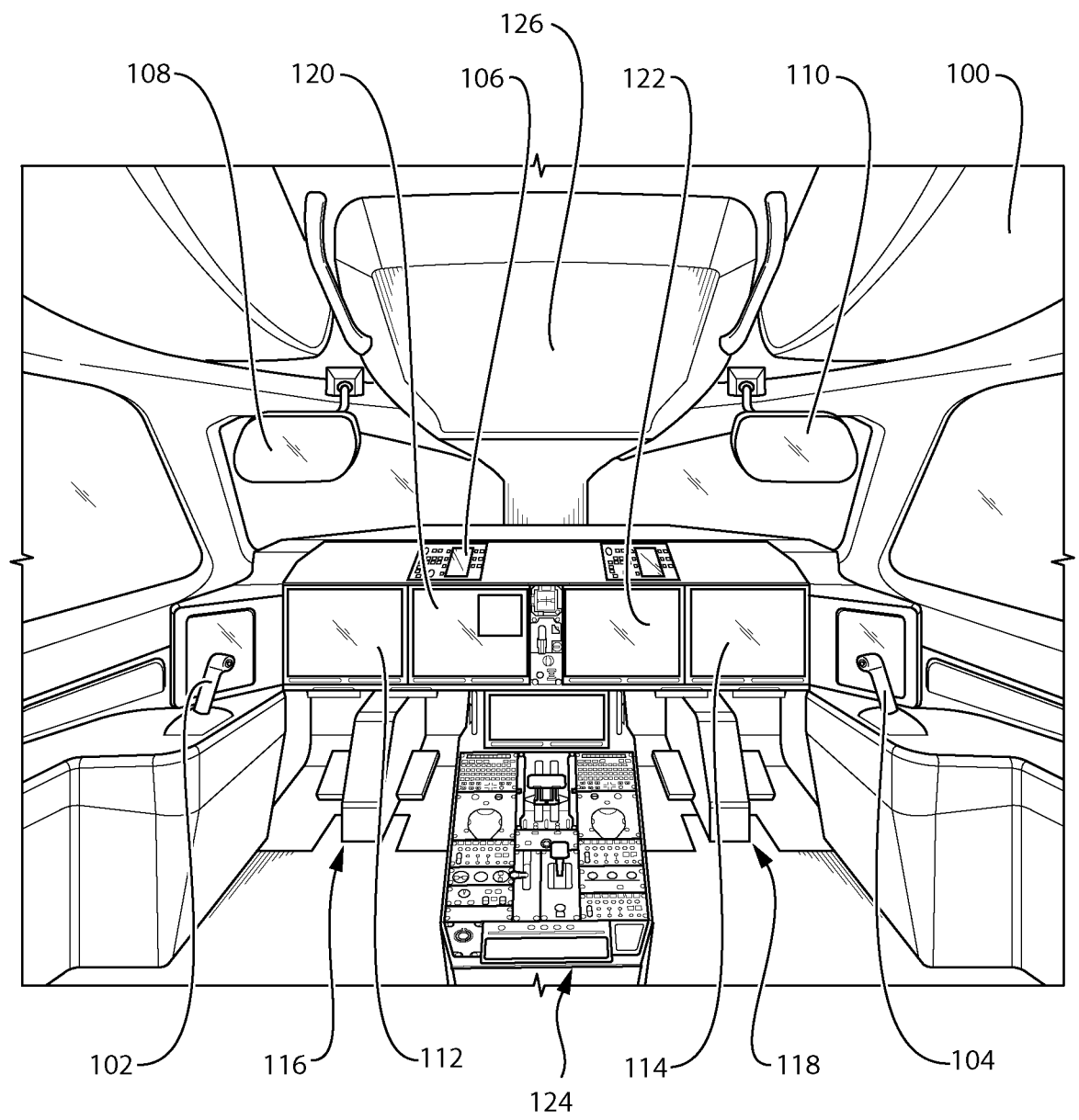
FIG. 1 is a front elevation view of an exemplary aircraft cockpit.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", a "controller" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown an aircraft cockpit 100 for use with some implementations of the present technology. The aircraft cockpit 100 comprises various human-machine interfaces allowing one or more crew members to interact with and/or control various systems of an aircraft. In some embodiments, the aircraft cockpit 100 may equally be referred to as an aircraft flight deck. In the illustrated embodiment, the aircraft cockpit 100 comprises multiple aircraft controllers which crew members, such as a pilot and a co-pilot, may use to input aircraft control inputs. In some embodiments, the aircraft control inputs, also referred to as aircraft control commands or commands, are inputted by the pilot or the co-pilot via a physical displacement of one or more of the aircraft controllers. In some embodiments, each control input may be associated with an orientation (also referred to as a direction) and an amplitude. Typically, when the aircraft is in flight, the orientation allows the pilot or co-pilot to control one or more of a pitch, roll and/or yaw of the aircraft and the amplitude allows the pilot or co-pilot to control an intensity of a modification of the pitch, roll and/or yaw of the aircraft. In some embodiments, the intensity may be associated with angle variations of the pitch, roll and/or yaw of the aircraft. In some embodiments, the one or more aircraft controllers translate a physical displacement into analogic or digital signals which may then be transmitted to aircraft systems such as, but not limited to, a flight computer (such as the flight computer 201 illustrated a FIG. 2). In some embodiments, the aircraft controllers may comprise one or more of a first side stick 102, a second side stick 104, a first set of rudder pedals 116 and a second set of rudder pedals 118.

The cockpit 100 also includes a center pedestal 124 which includes a throttle control module flap (not numbered), a speed brake (not numbered), trim and fuel control modules (not numbered) and provisions for other avionics equipment, such as displays, and cursor control devices, at it is known in the art. Generally, the throttle control modules may be used by the pilot and co-pilot to modulate engine thrust via electronic signals sent to the full authority digital engine control (FADEC) of the engines. When the aircraft is in autopilot mode, the throttle levers may be motor driven to indicate to the pilot and co-pilot the setting selected by the autopilot system. As a non-limiting example, the center pedestal 124 may allow to provide control and/or feedback with respect to control navigation radios (not depicted), audio control panels (ACP), a transponder panel (not depicted), a weather radar panel (not depicted), a rudder & aileon trim panel (not depicted), automatic direction finder (ADF) radios (not depicted), an EVAC panel (not depicted), and a cabin phone panel (not depicted).

The cockpit 100 also includes an overhead panel 126, located above the pilot and co-pilot. The overhead panel 126 generally includes controls for a variety of systems, such as an auxiliary power unit (not depicted), engines including left and right engines (not depicted), fuel (not depicted), air (not depicted), window heat (not depicted), primary flight control (not depicted), secondary flight control (not depicted), cockpit voice recorder (CVR), hydraulic (not depicted), electrical (not depicted), external lights (not depicted), anti-ice (not depicted), cargo (not depicted), equipment cooling (not depicted), pressurization (not depicted), and other systems, as it is known in the art.

Even though the first side stick 102 and the second side stick 104 implemented in the form of a joystick are illustrated in FIG. 1, other variations of aircraft controllers may equally be envisioned such as aircraft control columns implemented in the form of a yoke. In some instances, the first side stick 102 and the second side stick 104 are located on side consoles of the aircraft cockpit 100 so as to be handled by either a right hand or a left hand of the pilot or the co-pilot. Other locations may also be envisioned, in particular when the aircraft controller is implemented via a yoke, such as, but not limited to, in a space located between the legs of the pilot and co-pilot when they are sitting in their respective seats. Other variations as to how the first side stick 102 and the second side stick 104 may be implemented and where they may be located in the aircraft cockpit 100 may be envisioned without departing from the scope of the present technology and will become apparent to the person skilled in the art of the present technology.

In the embodiment illustrated in FIG. 1, the first set of pedals 116 and the second set of pedals 118 are positioned in a space beneath the various displays so as to be controllable by the feet of the pilot and the co-pilot when they are sitting in their respective seats. In some embodiments, the first set of pedals 116 and the second set of pedals 118 are mechanically and/or hydraulically connected to one or more rudders of the aircraft. In some embodiments, the first set of pedals 116 and the second set of pedals 118 are part of a fly-by-wire system and, as such, are electronically connected to a flight computer. Other variations as to how the first set of pedals 116 and the second set of pedals 118 are implemented may be envisioned and will become apparent to the person skilled in the art of the present technology.

In the embodiment illustrated in FIG. 1, the aircraft cockpit 100 also comprises a glare shield 106 and display surfaces. The glare shield 106 may comprise various control and interface elements such as control buttons (not shown) allowing the pilot and/or the co-pilot to define which one of the first side stick 102 and the second side stick 104 has priority. Such control buttons may allow one of the pilot and the co-pilot to ensure that only her/his control inputs are taken into consideration irrespectively of control inputs made by the other one of the pilot and the co-pilot.

The display surfaces may comprise a first head-up display 108, a second head-up display 110, a first primary flight display 112, a second primary flight display 114, a first EICAS display 120 and a second EICAS display 122. In some embodiments, the first head-up display 108 and the second head-up display 110 are implemented via a see-through surface (e.g., glass) allowing projections of images on display surfaces while allowing the pilot and/or co-pilot to remain aware of certain parameters relating to the operation of the aircraft without modifying her/his normal line of sight. In some embodiments, the first head-up display 108, the second head-up display 110, the first primary flight display 112 and the second primary flight display 114 present parameters relating to the operation of the aircraft and/or navigational information. In some embodiments, the first EICAS display 120 and the second EICAS display 122 may present information relating to operations of one or more engines and other systems of the aircraft. As the reader will appreciate, the first head-up display 108, the second head-up display 110, the first primary flight display 112, the second primary flight display 114, the first EICAS display 120 and the second EICAS display 122 are examples of display surfaces on which a single visual indication generated in accordance with the present technology may be displayed. Other variations may be envisioned, whether via display systems attached to the aircraft cockpit 100 or display systems which may be brought into the aircraft cockpit 100 (such as a tablet, a phablet, a phone, etc) or even worn by the pilot and/or co-pilot such, but not limited to, an augmented reality helmet, augmented reality glasses, augmented reality lenses, etc. Other variations as to how a display surface may be implemented may be envisioned and will become apparent to the person skilled in the art of the present technology.

The first head-up display 108, the second head-up display 110, the first primary flight display 112, the second primary flight display 114, the first EICAS display 120 and the second EICAS display 122 may be configured to display information about a plurality of aircraft systems, subsystems and system functions.

Generally, an aircraft includes a plurality of direct-sensing instrument systems (not depicted) and remote-sensing instrument systems (not depicted), which allow relaying information about different aircraft systems to the first head-up display 108, the second head-up display 110, the first primary flight display 112, the second primary flight display 114, the first EICAS display 120 and the second EICAS display 122.

As non-limiting examples, engine sensors include $N_1$, $N_2$, $N_3$ sensors, engine pressure ratio (EPR), exhaust gas temperature gauge (EGT), fuel flow (FF), Oil press, Oil quantity, Oil temperature, Vibration. System sensors include hydraulic quantity & press. ADC hydraulic system temperature, control surface positions, generator drive temperature, environmental control system (ECS) temperatures, auxiliary power unit (APU) EGT, revolutions per minute (RPM), Brake temperature. The various aircraft instruments are well known in the art.

Non-limiting examples of systems and subsystems include: flight control systems, engine control systems, communication systems, fuel systems, hydraulic systems, electrical systems, pneumatic systems, environmental control systems, emergency systems, and advanced systems.

Each of the systems and subsystems may have one or more system functions, allowing to monitor and modify different system parameters via, for example, the first primary flight display 112, the second primary flight display 114, the first EICAS display 120 and the second EICAS display 122. Generally, the system functions are available when the system and associated subsystems are operative, and may become unavailable when the system and associated subsystems become faulty or inoperative. As a non-limiting example, a fuel system including a fuel pump, a fuel control, fuel manifolds, fuel nozzles, a fuel filter, heat exchangers, drains, a pressurizing and dump valve may be associated with the fuel control function, which allows to provide the required amount of fuel to the fuel nozzles at the requested time, where the rate at which fuel is supplied to the nozzles determines the acceleration or deceleration of the engine.

Figure 2:
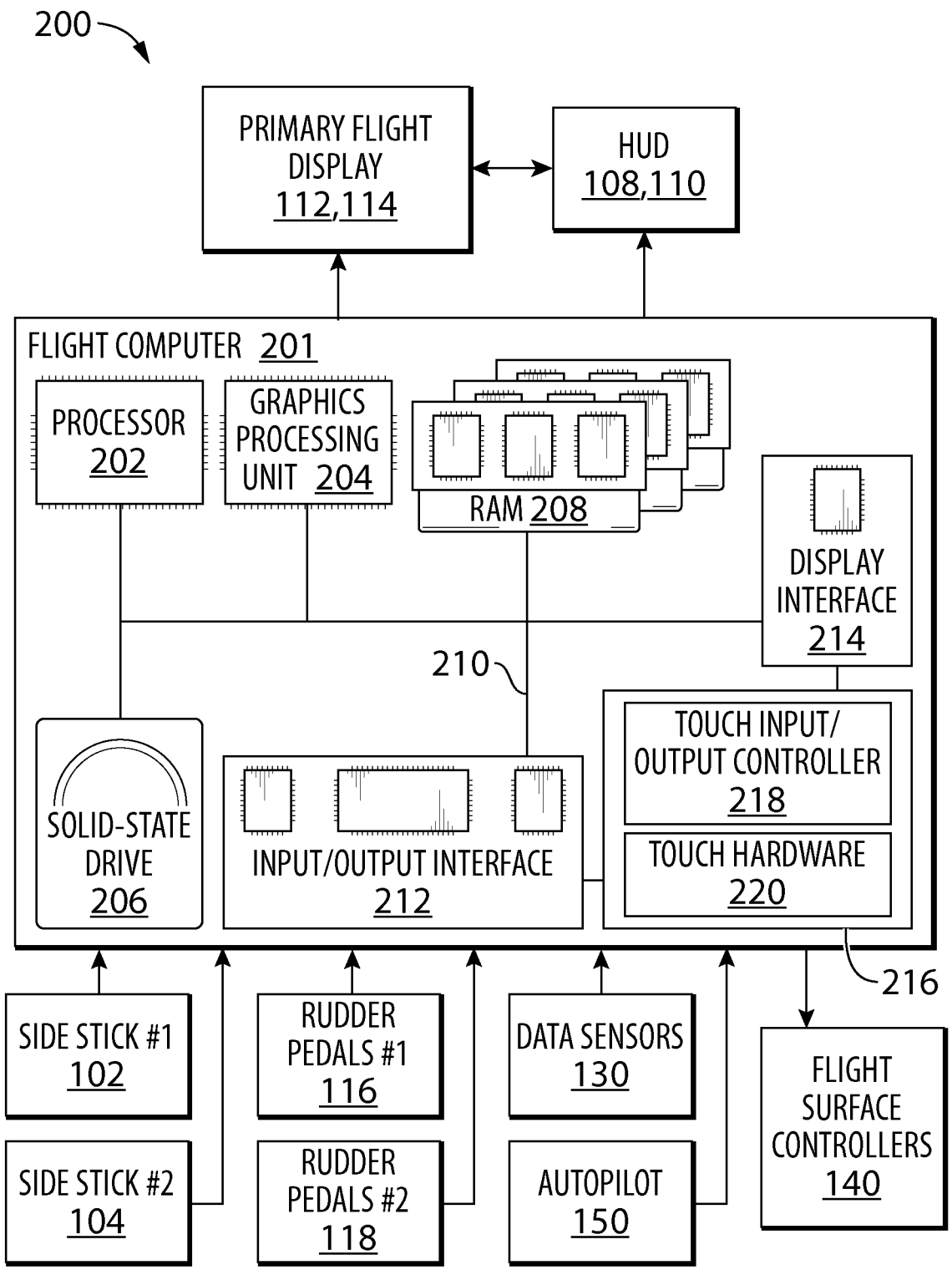
FIG. 2 is a diagram of a networked computing environment in accordance with an embodiment of the present technology.

Referring to FIG. 2, there is shown an aircraft computer environment 200 suitable for use with some implementations of the present technology. In the illustrated embodiment, the aircraft computer environment 200 comprises a flight computer 201. The flight computer 201 comprises various hardware components including one or more single or multi-core processors collectively represented by a processor 202, a graphics processing unit (GPU) 204, a solid-state drive 206, a random access memory 208, a display interface 214, and an input/output interface 212. The flight computer 201 may be an avionic computer specifically designed for installation into an aircraft. In some alternative embodiments, the flight computer 201 may be a generic computer system adapted to meet certain requirements, such as, but not limited to, certification requirements. As previously mentioned in the sections above, the flight computer 201 may be an "electronic device", a "controller", an "flight control computer", "a flight control system", a "flight computer", an "avionic computer", an "Engine-Indicating and Crew-Alerting System (EICAS)", a "server", a, "remote server", a "computer-based system" and/or any combination thereof appropriate to the relevant task at hand. Even though reference is made to a "flight computer", it should be understood that this aspect is not limitative and that the flight computer 201 does not need or require to control or contribute to control the aircraft to enable the present technology. In some embodiments, the flight computer 201 may also be a subsystem of one of the above-listed systems. In some other embodiments, the flight computer 201 may be an "off the shelf" generic computer system. In some embodiments, the flight computer 201 may also be distributed amongst multiple systems. The flight computer 201 may also be specifically dedicated to the implementation of the present technology. As a person in the art of the present technology may appreciate, multiple variations as to how the flight computer 201 is implemented may be envisioned without departing from the scope of the present technology.

Communication between the various components of the flight computer 201 may be enabled by one or more internal and/or external buses 210 (e.g. a PCI bus, universal serial bus, IEEE 1394 "Firewire" bus, SCSI bus, Serial-ATA bus, ARINC bus, etc.), to which the various hardware components are electronically coupled. A display interface 214 may be coupled to (e.g., via a cable or a bus) the first primary flight display 112, the second primary flight display 114, the first "Head-Up Display (HUD)" 108 and/or the second head-up display 110. In some embodiments, the display interface 214 may be coupled to a display surface dedicated to the display of the single visual indication in accordance with the present technology.

The input/output interface 212 may be coupled to a touchscreen 216 and to the one or more internal and/or external buses 210. The touchscreen 216 may be part of the first primary flight display 112 and/or the second primary flight display 114 or may be part of a separate display. In the embodiments illustrated in FIG. 2, the touchscreen 216 comprises touch hardware 220 (e.g., pressure-sensitive cells embedded in a layer of a display allowing detection of a physical interaction between a user and the display) and a touch input/output controller 218 allowing communication with the display interface 214 and/or the one or more internal and/or external buses 210. In some embodiments, the input/output interface 212 may be connected to a keyboard (not shown), a mouse (not shown) or a trackpad (not shown) allowing the user to interact with the flight computer 201 in addition or in replacement of the touchscreen.

According to implementations of the present technology, the solid-state drive 206 stores program instructions suitable for being loaded into the random access memory 208 and executed by the processor 202 and/or the GPU 204 for processing activity indications associated with a user. For example, the program instructions may be part of a library or an application.

In the example of FIG. 2, the flight computer 201 may be in communication with multiple systems, such as, but not limited to, an aircraft engine controller (not shown) and a control panel (not shown). The flight computer 201 may also be connected to a fly-by-wire system and/or be part of a fly-by-wire architecture. In the illustrated embodiment, the flight computer 201 is configured so as to interact (for example, but without being limited to, via a wire or a wireless connection) with the first side stick 102, the second side stick 104, the first rudder pedals 116 and/or the second rudder pedals 118. In some embodiments, the flight computer 201 is configured so as to interact (for example, but without being limited to, via a wired or a wireless connection) with an autopilot system 150, data sensors 130 and/or flight surface controllers 140. In some embodiments, the autopilot system 150 may generate an indication indicative of an aircraft control input and then transmit the generated indication to the flight computer 201 as if the aircraft control input has been generated by the first side stick 102, the second side stick 104, the first rudder pedals 116 and/or the second rudder pedals 118. In some embodiments, the data sensors 130 provide data relating to a condition of operation of the aircraft, such as, but not limited to, air speed, actual roll, pitch and/or yaw, etc. In some embodiments where the flight computer 201 allows control of the aircraft, the flight computer 201 may generate control commands based on one or more aircraft control inputs, data from the data sensors and control logic. The generated control commands may then be transmitted to the flight surface controllers 140 so to modify a position/orientation of one or more flight control surfaces.

In some embodiments, the flight computer 201 may be configured so as to receive a digital and/or analogic signal from at least one of the first side stick 102, the second side stick 104, the first rudder pedals 116, the second rudder pedals 118 and/or the autopilot and generate, based on the digital and/or analogic signal, an indication of an aircraft control input.

In some embodiments, the flight computer 201 may be configured so as to receive a digital and/or analogic signal from a plurality of systems and associated subsystems of the aircraft, and determine, at least partially, the operative status of the systems functions of the plurality of systems and associated subsystems. In some other embodiments, the flight computer 201 may generate the indication indicative of operative status of the system functions based on a combination of two or more of the digital and/or analogic signals received from at least one of the plurality of systems and associated subsystems.

In some embodiments, the flight computer 201 may be configured to monitor the plurality of systems and associated subsystems, and may be configured to use dependency models to determine which systems and subsystems cannot provide its associated system functions.

Figure 3:
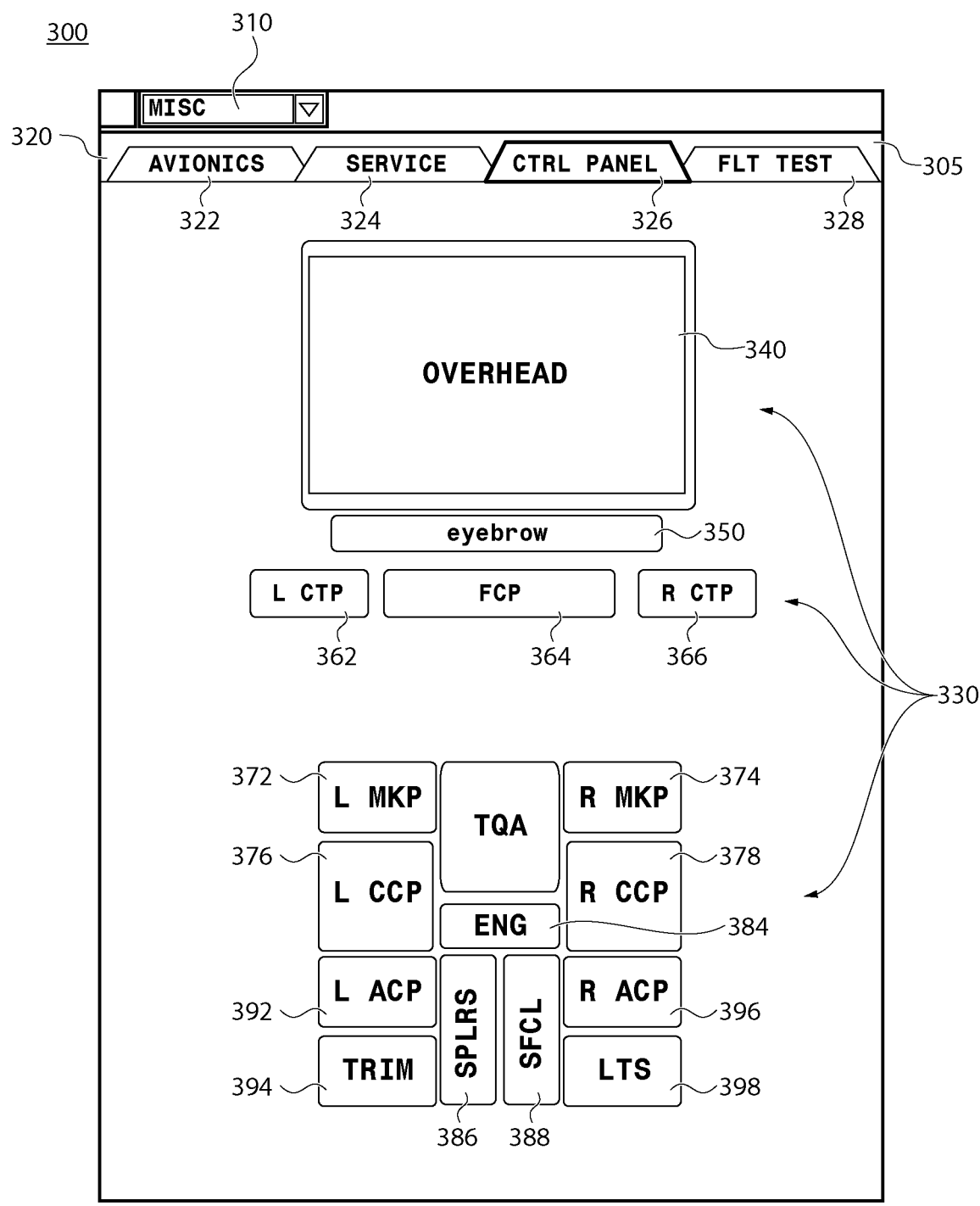
FIG. 3 is a diagram illustrating a first display in accordance with an embodiment of the present technology.

Turning now to FIG. 3, a display 300 is shown. In some embodiments, the display 300 may be displayed on a display surface, such as one of the first head-up display 108, the second head-up display 110, the first primary flight display 112, the second primary flight display 114, the first EICAS display 120 and/or the second EICAS display 122 or a sub-portion thereof. In some embodiments, a same display 300 may be presented to a pilot on the first head-up display 108, the first primary flight display 112 and/or the first EICAS display 120 and to a co-pilot on the second head-up display 110, the second primary flight display 114 and/or the second EICAS display 122. In some embodiments, the display 300 may be presented to the pilot and/or the co-pilot in response to an event relating to the operation of the aircraft. As an example, the first primary flight display 112 may present standard information up until an event is detected. Upon detection of the event, the first EICAS display 120 may then display the display 300 either on an entirety of a display surface or on a portion of a display surface. As an example, the event may be an abnormal event occurring before, during or after a flight. A non-limiting example of an event includes an electrical short or malfunction that can disable a number of hardwired controls on one of the control panels in the cockpit.

In some other embodiments, the display 300 may be manually activated by the pilot and/or the co-pilot. As a result, it should be understood that both a permanent display and a temporary display may be envisioned. In addition, in some embodiments, only specific graphical components may be permanently or temporarily displayed.

In the illustrated embodiment, the display 300 is displayed on the first EICAS display 120. The display 300 includes an interactive interface 305 with a dropdown menu 310.

The dropdown menu 310 allows selecting an element to display on the interactive interface 305 from a list (not depicted). In the illustrated embodiment, the miscellaneous (MISC) option is selected and may have been automatically triggered by an abnormal event during operation of the aircraft, such as a failure of one or more communication systems and subsystems of the aircraft.

The MISC option of the dropdown menu 310 gives access to a various type of options on the interactive interface 305 with a plurality of tabs 320 including an avionics tabs 322, a service tab 324, a control (CTRL) panel tab 326, and a flight test (FLT) tab 328.

In the illustrated embodiment, the CTRL panel tab 326 is active, which may be indicated by a tab of darker color. The CTRL panel tab 326 includes a plurality of actuatable buttons 330. Each of the plurality of actuatable buttons 330 may be actuated to give access to a submenu on the first EICAS display 120 or on another one of the displays. A selected actuatable button may be associated with a visual indication that the actuatable button has been selected. The manner in which the visual indication is implemented is not limited, and includes a change in a size of the button, a color of the button, a text in the button, etc. In the present embodiment, a selected button has a cyan colored contour.

As a non-limiting example, on the first EICAS display 120 and the second EICAS display 122, warnings that require immediate action may be associated with a red color, cautions with a yellow color, advisories with a cyan color, and data status date with a white color.

The first row (not numbered) of the plurality of actuatable buttons 330 include an overhead button 340, an eyebrow button 350, a left control and radio tuning panel (L CTP) button 362, a flight control panel (FCP) button 364 and a right control and radio tuning panel (L CTP) button 366.

The overhead button 340 may be used for accessing a status display for the overhead panel 126 located above the pilot and co-pilot. The eyebrow button 350 may be used for accessing a status display for a control panel located proximate a glareshield. The L CTP button 362, the FCP button 364 and the R CTP button 366 may be used to access a status display of, respectively, the left control and radio tuning panel, the flight control panel and the right control and radio tuning panel (not depicted).

The second row (not numbered) of the plurality of actuatable buttons 330 includes a left multifunction keyboard panel (L MKP) button 372, a throttle quadrant assembly (TQA) button 380, a right multifunction keyboard panel (R MKP) button 374, a left cursor control panel (L CCP) button 376, a right cursor control panel (R CCP) button 378, an engine (ENG) button 384, a left audio control panel (L ACP) button 392, a trim function (TRIM) button 394, a spoilers control (SPLRS) button 386, a slat-flap control lever (SFCL) button 388, a right audio control panel (R ACP) button 396 and a lights (LTS) button 398.

The L CTP button 362, the R CTP button 366, L MKP button 372, the R MKP button 374, the L CCP 376 and the R CCP 378 may be used to access status displays for the multifunctional keyboard panels and cursor control panels.

The TQA button 380 may be used for accessing a status display for the throttle quadrant assembly and related options, and the ENG button 384 may be used for accessing a status display for the engine control panel. The L ACP button 392 and the R ACP button 396 give access to a status display for the communication panels, including air-to-ground communication, interphone and cabin communication.

Figure 4:
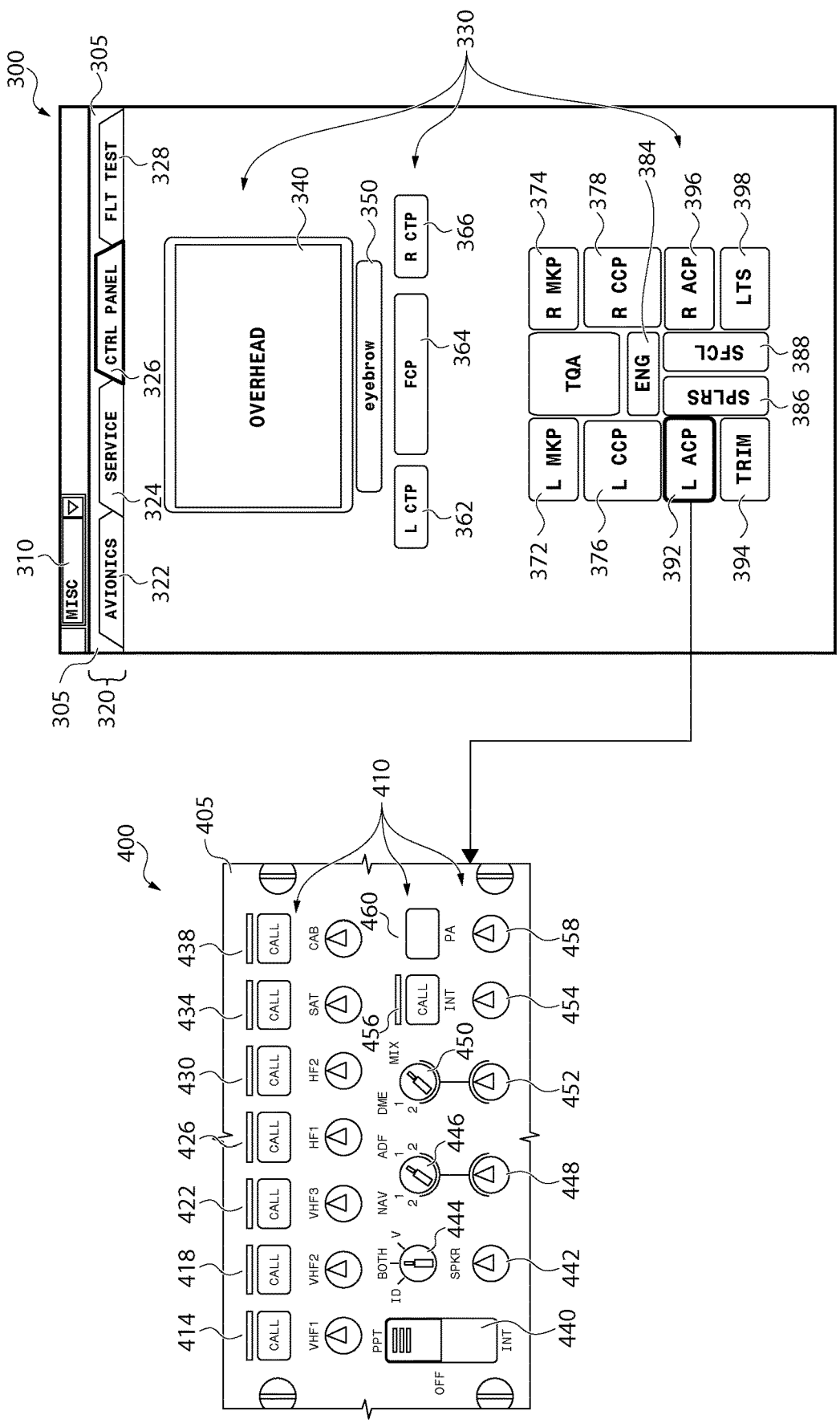
FIG. 4 is a diagram illustrating a second display in accordance with an embodiment of the present technology.

With reference to FIG. 4, there is depicted the display 300 and a display 400, when the L ACP button 392 has been selected on the display 300, as indicated by the contour of the L ACP button 392

In the illustrated embodiment, the display 400 has been triggered after a faulty event was detected in one of the communication subsystems. In prior art systems, a pilot could receive a general error message indicating that a control panel has suffered a malfunction. However, such a general error message may not indicate whether a portion of the controls or switches on the malfunctioning control panel are nevertheless functional. Generally, the purpose of the display 400 is to graphically represent a hardware control panel and depict the status of the switches and/or indicators. The buttons on the display 400 may not be actuatable.

Generally, audio control panels represented in the status display accessed via the L ACP button 392 and/or R ACP button 396 may be used to select and control received audio from the communication and navigation systems, as well as to connect microphone keying and audio to the HF/VHF communication radios, the PA system, and the crew and service interphone. The display 400 includes a status display interface 405 with a plurality of buttons 410.

In the embodiment illustrated herein, the first row of the plurality of buttons 410 of the status display interface 405 includes graphical representations of a Very high-frequency 1 (VHF 1) rotary knob 412 associated with a VHF 1 indicator 414, a VHF 2 rotary knob 416 associated with a VHF 2 indicator 418, a VHF 3 rotary knob 420 associated with a VHF 3 indicator 422, a high-frequency (HF 1) rotary knob 424 associated with a HF 1 indicator 426, a HF 2 rotary knob 428 associated with a HF 2 indicator 430, a satellite (SAT) rotary knob 432 associated with a SAT indicator 434, and a cabin (CAB) rotary knob 436 associated with a CAB indicator 438.

On the control panel represented by the status display interface 405, the VHF 1 rotary knob 412, the VHF 2 rotary knob 416 and the VHF 3 rotary knob 420 allow controlling the respective very high-frequency antennas of the aircraft (not depicted). The HF 1 rotary knob 424 and the HF 2 rotary knob 428 allow controlling the respective high-frequency antennas of the aircraft (not depicted). The SAT rotary knob 432 allows controlling the satellite antenna of the aircraft (not depicted). The CAB rotary knob 436 allows controlling communication with the cabin of the aircraft.

Each of the VHF 1 rotary knob 412, the VHF 2 rotary knob 416 and the VHF 3 rotary knob 420, the HF 1 rotary knob 424, the HF 2 rotary knob 428, the SAT rotary knob 432 and the CAB rotary knob 436 are associated respectively with the VHF 1 indicator 414, the VHF 2 rotary knob 416, the VHF 3 indicator 422, the HF indicator 426, the HF 2 indicator 430, the SAT indicator 434 and the CAB indicator 438, which have an operative status indicator and a CALL button. The operative status indicator of each one of the VHF 1 indicator 414, the VHF 2 indicator 418, the VHF 3 indicator 422, the HF indicator 426, the HF 2 indicator 430 may be color coded and indicate the respective operative status of each of the indicators on the display 400. As a non-limiting example, a green color may be associated with a functioning system, and an absence of color may be associated with a faulty system. In the illustrated embodiment, the VHF 1 indicator 414, the VHF 2 indicator 418, the VHF 3 indicator 422, the HF indicator 426, the HF 2 indicator 430 have a functional operative status.

The second row of the plurality of buttons 410 of the status display interface 405 includes a push-to-talk (PPT) switch 440, A BOTH rotary knob 444, a navigation (NAV)/automatic direction finder (ADF) rotary knob 446 associated with a rotary knob 448, a distance measuring equipment (DME)/MIX rotary knob 450 associated with a rotary knob indicator 452, a speaker (SPKR) rotary knob 442, an interior (INT) rotary knob 454 associated with an INT indicator 456 and a public address (PA) rotary knob 458 associated with a PA indicator 460.

On the control panel represented by the status display interface 405, the PPT switch 440 allows activating or deactivating the push-to-talk function, and the NAV/ADF rotary knob 446 allows switching between two navigation modes and two automatic direction finder mode, which allow to automatically and continuously display the relative bearing from aircraft to a suitable radio station. The SPKR rotary knob 442 allows controlling volume of the speaker, the INT rotary knob 454 allows controlling the interior volume and the PA rotary knob 458 allows controlling the volume during public address. The INT indicator 456 associated with the INT rotary knob 454 and the PA indicator 460 associated with the PA rotary knob 458 indicate the operative status respectively of the INT and PA systems. In the illustrated embodiment, the INT indicator 456 is functional, while the PA indicator 460 is not functional, so as to indicate that the public address system is faulty.

Figure 5:
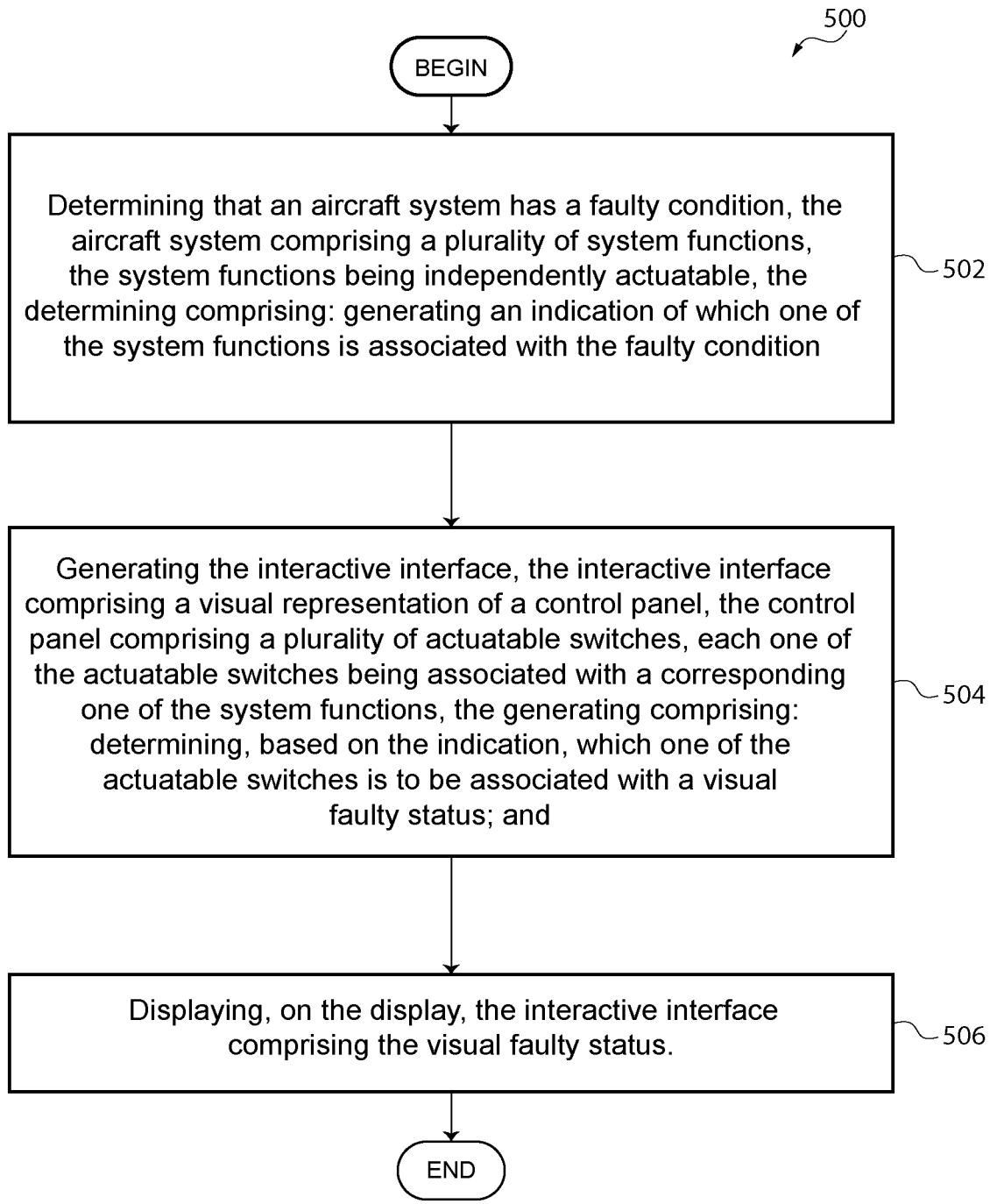
FIG. 5 is a diagram illustrating a first flowchart illustrating a computer-implemented method implementing embodiments of the present technology.

Having described, with reference to FIG. 1 to FIG. 4, some non-limiting example instances of systems and computer-implemented methods used in connection with the problem of displaying information on an interactive interface to indicate which controls are still available during an aircraft abnormal event, we shall now describe general solutions to the problem with reference to FIG. 5.

More specifically, FIG. 5 shows a flowchart illustrating a first computer-implemented method 500 of displaying an status display interface 405 during an aircraft abnormal event.

The method 500 starts at step 502 by determining that an aircraft system has a faulty condition, the aircraft system comprising a plurality of system functions, the system functions being independently actuatable, wherein the determining comprises generating an indication of which one of the system functions is associated with the faulty condition. As a non-limiting example, the communication system of the aircraft may have a faulty condition because of an electrical malfunction, which triggers the display of the status display interface 405 on the display 400 of the first EICAS display 120. As another non-limiting example, a "L CTP FAIL" caution message may be triggered by the avionics system of the aircraft when at least a portion of the left control and radio tuning panel becomes faulty.

Then, at step 504, the method 500 proceeds to generate the status display interface 405, the status display interface 405 comprising a visual representation of a control panel, the control panel comprising a plurality of switches or buttons 410, each one of the actuatable or buttons 410 being associated with a corresponding one of the system functions, and wherein the generating comprises determining, based on the indication, which one of the switches 410 is to be associated with a visual faulty status. In the present embodiment, the PA system of the communication system may be defective, as indicated by the PA indicator 460 associated with the PA rotary knob 458 on the status display interface 405 display 400, which acts a control panel for the communication system of the aircraft.

In some embodiments, the visual faulty status comprises a visual representation that the actuatable switch is no longer actuatable. In some embodiments, the visual faulty status comprises at least one of: a color code and an icon representative of a faulty status. In some embodiments, the actuatable switches 410 that are not associated with the visual faulty status are actuatable through the status display interface 405 and the actuatable switches 410 that are associated with the visual faulty status are not actuatable through the status display interface 405. In some embodiments, the actuatable switches comprises visual representation of: a knob, a switch, a slider, and a toggle button. In some embodiments, the actuatable switches comprise tactile actuatable switches.

At step 506, the method 500 proceeds to display, on the first EICAS display 120, the status display interface 405 comprising the visual faulty status on the PA indicator 460.

The method 500 may then end.

While the above-described implementations have been described and shown with reference to particular steps performed in a particular order, it will be understood that these steps may be combined, sub-divided, or re-ordered without departing from the teachings of the present technology. The steps may be executed in parallel or in series. Accordingly, the order and grouping of the steps is not a limitation of the present technology.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for generating an interactive interface on a display of an aircraft for providing an indication of failed cockpit panels, the method executable by an electronic device connected to the display, the method comprising:
   determining that an aircraft system has a faulty condition, the aircraft system comprising a plurality of system functions associated with hardwired controls on a cockpit control panel, commands associated with said hardwired controls being input via physical displacement of a plurality of controllers, the plurality of controllers being separately disposed and actuatable from the interactive interface, the system functions being independently actuatable, the determining comprising:
　generating an indication that a given system function of the system functions is associated with the faulty condition;
generating the interactive interface, the interactive interface comprising a visual representation of a control panel, the visual representation of the control panel comprising a plurality of actuatable switches, each one of the actuatable switches being associated with a corresponding one of the system functions, the generating comprising:
　determining, based on the indication, which one of the actuatable switches is to be associated with a visual faulty status; and
displaying, on the display, the interactive interface comprising the visual faulty status, wherein at least one controller of the plurality of controllers corresponding to the given system function is operative even when a failure of the given system function is reported, the at least one controller being operable separate from the interactive interface.

2. The method of claim 1, wherein the visual faulty status comprises a visual representation that the actuatable switch is no longer actuatable.

3. The method of claim 2, wherein the visual faulty status comprises at least one of a color code and an icon representative of a faulty status.

4. The method of claim 3, wherein the actuatable switches that are not associated with the visual faulty status are actuatable through the interactive interface and the actuatable switches that are associated with the visual faulty status are not actuatable through the interactive interface.

5. The method of claim 4, wherein the display is a touchscreen.

6. The method of claim 5, wherein the display is part of an Engine Indication and Crew Alerting System (EICAS).

7. The method of claim 4, wherein the aircraft system comprises at least one of a flight control system, a communication system, an engine control system, a fuel system, a hydraulic system, an electrical system, a pneumatic system, an environmental control system, an emergency system and an advanced system.

8. The method of claim 4, wherein the actuatable switches comprise visual representation of at least one of a knob, a switch, a slider, and a toggle button.

9. The method of claim 4, wherein the actuatable switches comprise tactile actuatable switches.

10. An apparatus for generating an interactive interface on a display of an aircraft for providing an indication of failed cockpit panels, the apparatus comprising:
　a display device;
　one or more data processors operatively coupled to the display device; and
　a non-transitory machine-readable memory operatively coupled to the one or more data processors, storing instructions executable by the one or more data processors and configured to cause the one or more data processors to:
　　determine that an aircraft system has a faulty condition, the aircraft system comprising a plurality of system functions associated with hardwired controls on a cockpit control panel, commands associated with said hardwired controls being input via physical displacement of a plurality of controllers, the plurality of controllers being separately disposed and actuatable from the interactive interface, the system functions being independently actuatable, the determining comprising:
　　　generating an indication that a given system function of the system functions is associated with the faulty condition;
　　generate the interactive interface, the interactive interface comprising a visual representation of a control panel, the visual representation of the control panel comprising a plurality of actuatable switches, each one of the actuatable switches being associated with a corresponding one of the system functions, the generating comprising:
　　　determining, based on the indication, which one of the actuatable switches is to be associated with a visual faulty status; and
　　display, on the display, the interactive interface comprising the visual faulty status wherein at least one controller of the plurality of controllers corresponding to the given system function is operative even when a failure of the given system function is reported, the at least one controller being operable separate from the interactive interface.

11. The apparatus of claim 10, wherein the visual faulty status comprises a visual representation that the actuatable switch is no longer actuatable.

12. The apparatus of claim 11, wherein the visual faulty status comprises at least one of a color code and an icon representative of a faulty status.

13. The apparatus of claim 12, wherein the actuatable switches that are not associated with the visual faulty status are actuatable through the interactive interface and the actuatable switches that are associated with the visual faulty status are not actuatable through the interactive interface.

14. The apparatus of claim 13, wherein the display is a touchscreen.

15. The apparatus of claim 14, wherein the display is part of an Engine Indication and Crew Alerting System (EICAS).

16. The apparatus of claim 13, wherein the aircraft system comprises at least one of a flight control system, a communication system, an engine control system, a fuel system, a hydraulic system, an electrical system, a pneumatic system, an environmental control system, an emergency system and an advanced system.

17. The apparatus of claim 13, wherein the actuatable switches comprise visual representation of at least one of a knob, a switch, a slider, and a toggle button.

18. The apparatus of claim 13, wherein the actuatable switches comprise tactile actuatable switches.

19. A computer program product for generating an interactive interface on a display of an aircraft for providing an indication of failed cockpit panels, the computer program product comprising a non-transitory computer readable storage medium containing program code, the program code readable/executable by a computer, processor or logic circuit to perform a method comprising:
　determining that an aircraft system has a faulty condition, the aircraft system comprising a plurality of system functions associated with hardwired controls on a cockpit control panel, commands associated with said hardwired controls being input via physical displacement of a plurality of controllers, the plurality of controllers being separately disposed and actuatable from the interactive interface, the system functions being independently actuatable, the determining comprising:

generating an indication that a given system function of the system functions is associated with the faulty condition;

generating the interactive interface, the interactive interface comprising a visual representation of a control panel, the visual representation of the control panel comprising a plurality of actuatable switches, each one of the actuatable switches being associated with a corresponding one of the system functions, the generating comprising:

determining, based on the indication, which one of the actuatable switches is to be associated with a visual faulty status; and displaying, on the display, the interactive interface comprising the visual faulty status, wherein at least one controller of the plurality of controllers corresponding to the given system function is operative even when a failure of the given system function is reported, the at least one controller being operable separate from the interactive interface.

20. The computer program product of claim 19, wherein the visual faulty status comprises a visual representation that the actuatable switch is no longer actuatable.

21. The computer program product of claim 20, wherein the visual faulty status comprises at least one of a color code and an icon representative of a faulty status.

22. The computer program product of claim 21, wherein the actuatable switches that are not associated with the visual faulty status are actuatable through the interactive interface and the actuatable switches that are associated with the visual faulty status are not actuatable through the interactive interface.

23. The computer program product of claim 22, wherein the display is a touchscreen.

24. The computer program product of claim 23, wherein the display is part of an Engine Indication and Crew Alerting System (EICAS).

25. The computer program product of claim 22, wherein the aircraft system comprises at least one of a flight control system, a communication system, an engine control system, a fuel system, a hydraulic system, an electrical system, a pneumatic system, an environmental control system, an emergency system and an advanced system.

26. The computer program product of claim 22, wherein the actuatable switches comprise visual representation of at least one of a knob, a switch, a slider, and a toggle button.

27. The computer program product of claim 22, wherein the actuatable switches comprise tactile actuatable switches.

* * * * *